(12) United States Patent
Shlomot et al.

(10) Patent No.: US 7,787,597 B1
(45) Date of Patent: Aug. 31, 2010

(54) AUTOMATED TOOLS FOR TESTING ECHO CANCELLERS USING NATURAL SPEECH EXCITATIONS

(75) Inventors: Eyal Shlomot, Long Beach, CA (US);
Jeffrey D. Klein, Monterey, CA (US);
Carlo Murgia, Aliso Viejo, CA (US);
Adil Benyassine, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 1286 days.

(21) Appl. No.: 11/318,373

(22) Filed: Dec. 22, 2005

(51) Int. Cl.
*H04M 1/24* (2006.01)
(52) U.S. Cl. .................. 379/3; 379/406.01
(58) Field of Classification Search .............. 379/406.01–406.16; 381/93, 94.1; 370/286–290
See application file for complete search history.

(56) References Cited

U.S. PATENT DOCUMENTS

| | | | | |
|---|---|---|---|---|
| 4,156,304 A | * | 5/1979 | Lee | 600/440 |
| 5,150,714 A | * | 9/1992 | Green | 600/442 |
| 6,999,560 B1 | * | 2/2006 | Connor et al. | 379/3 |
| 7,359,489 B2 | * | 4/2008 | Page et al. | 379/3 |
| 2006/0098807 A1 | * | 5/2006 | Page et al. | 379/406.01 |

OTHER PUBLICATIONS

Funai Mikio, Doppler Radar Equipment, Jul. 9, 2003, pp. 1-47.*
Takahashi Fukutarou, Detectinggindication System for Scanning Sonar, Jul. 9, 1980, pp. 1-7.*

* cited by examiner

*Primary Examiner*—Fan Tsang
*Assistant Examiner*—Akelaw A Teshale
(74) *Attorney, Agent, or Firm*—Farjami & Farjami LLP

(57) ABSTRACT

There are provided methods and systems for automated testing of echo cancellers using natural speech excitations and evaluating an echo canceller by transmitting a first signal to the echo canceller, wherein the first signal includes a first speech signal and a first marker signal, and wherein the first marker signal is transmitted a first period of time after the first speech signal is transmitted; receiving a second signal from the echo canceller, wherein the second signal includes a second speech signal and a second marker signal; aligning the first speech signal and the second speech signal using the first marker signal and the second marker signal; determining a choppiness of the second speech signal, when a non-linear processor of the echo canceller is on; and determining an audible echo, when a non-linear processor of the echo canceller is off.

26 Claims, 5 Drawing Sheets

AUTOMATED TOOLS FOR TESTING ECHO CANCELLERS USING NATURAL SPEECH EXCITATIONS

BACKGROUND OF THE INVENTION

1. Field of the Invention

The present invention relates generally to testing tools for echo canceller systems in communication networks. More particularly, the present invention relates to methods and systems for automated testing of echo cancellers using natural speech excitations.

2. Background Art

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the speaker or the earpiece and microphone in the telephones. For a speakerphone, for example, the sound from the speaker is bounced off the walls, windows, and the like and is picked by the microphone. Similarly, an acoustic coupling can also happen in conventional or in wireless telephone handsets. The result of the hybrid echo and/or the acoustic echo reflections is the creation of single-path or multi-path echo, which would be heard by the talker unless eliminated.

As shown in FIG. 1, in modern telephone networks, echo canceller 140 is typically positioned between hybrid 130 and network 150. Generally speaking, echo cancellation process involves two steps. First, echo canceller 140 employs an adaptive filter to model hybrid echo 110 (and/or acoustic echo 120 if it exists). The adaptive filter adapts to create a model of echo signals, based on far-end signal 142 and local-end signal 132, which includes the echo signal of far-end signal 142 generated by hybrid 130. Far-end signal 142 is filtered by the adaptive filter to generate a model of echo generated by echo sources 110 and 120, and is subtracted from local-end signal 132 to generate a residual echo signal. Although this echo cancellation process removes a substantial amount of the echo, non-linear components of the echo may still remain in the residual echo signal. To cancel non-linear components of the echo, the second step of the echo cancellation process utilizes a non-linear processor (NLP) to eliminate the remaining or residual echo by attenuating the signal below the noise floor, and to generate output signal 144.

Because performance of echo cancellers is one of the key elements for ensuring network quality, various standards have been adopted for defining minimum echo canceller operating requirements. These standards are typically used as a benchmark for testing and selecting echo cancellers. A noteworthy standard is known as ITU-T (International Telecommunication Union-Telecommunication standardization sector) G.168, entitled "Digital Network Echo Cancellers", dated August 2004, which is hereby incorporated by reference in its entirety. Another standard is known as ITU-T P.831, entitled "Subjective Performance Evaluation of Network Echo Cancellers", dated December 1998, which is hereby incorporated by reference in its entirety.

However, it is well known that simply complying with G.168 or P.831 tests does not guarantee adequate echo cancellation performance outside a laboratory or testing environment. In fact, ironically, an echo canceller may fail G.168 or P.831 compliance test, but perform more effectively outside a laboratory or testing environment than some echo cancellers that pass the compliance test. This is because of many inherent drawbacks in the existing G.168 or P.831 compliance tests. For example, the automated objective tests of G.168 use artificially generated synthetic excitation and limited echo canceller operating scenarios due to the limitations of the automated measurements, and therefore the test results do not fully correlate with the performance of echo cancellers in a wide range of real-life operating scenarios. On the other hand, the manual subjective tests of P.831 are limited in scope and require live participants and statistical inferences, and can be quite expensive and time consuming.

Accordingly, there is a need in the art for a new approach to echo canceller compliance tests that can more accurately and effectively benchmark echo cancellers' performance under real-life conditions with less human interaction and costs.

SUMMARY OF THE INVENTION

The present invention is directed to methods and systems for automated testing of echo cancellers using natural speech excitations. According to one aspect of the present invention, there is provided a method of evaluating an echo canceller. The method comprises transmitting a first signal to the echo canceller, wherein the first signal includes a first speech signal and a first marker signal, and wherein the first marker signal is transmitted a first period of time after the first speech signal is transmitted; receiving a second signal from the echo canceller, wherein the second signal includes a second speech signal and a second marker signal; and aligning the first speech signal and the second speech signal using the first marker signal and the second marker signal.

In one aspect, the first signal is generated by a far-end signal generator. Yet, in another aspect, the first signal is generated by a near-end signal generator. In a further aspect, the first marker signal is a chirp signal having a frequency that varies linearly over time, for example, from high to low or low to high. Also, in one aspect, the method further comprises disabling the echo canceller after transmitting the first speech signal but prior to transmitting the first marker signal.

In an additional aspect, the echo canceller further comprises transmitting the third signal to the echo canceller, wherein a third signal includes a third speech signal and a third marker signal, and wherein the third marker signal is transmitted a second period of time after the third speech signal is transmitted; receiving a fourth signal from the echo canceller, wherein the fourth signal includes a fourth speech signal and a fourth marker signal; and aligning the third speech signal and the fourth speech signal using the third marker signal and the fourth marker signal; wherein the first period of time and the second period time are determined such that transmission of the first marker signal does not overlap with transmission of the third marker signal.

In a further aspect, the method further comprises determining a choppiness of the second speech signal based on analyzing the first speech signal and the second speech signal, when a non-linear processor of the echo canceller is on. For example, the choppiness is determined by integrating negative power differences between the first speech signal and the second speech signal.

In another aspect, the method further comprises determining an audible echo of the first speech signal in the second speech signal, when a non-linear processor of the echo canceller is off. The method may further include determining an echo signal by subtracting the second signal from the first signal, calculating an audible masking function based on the echo signal and the first signal, and integrating regions defined by the audible masking function, the echo signal and the first signal.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
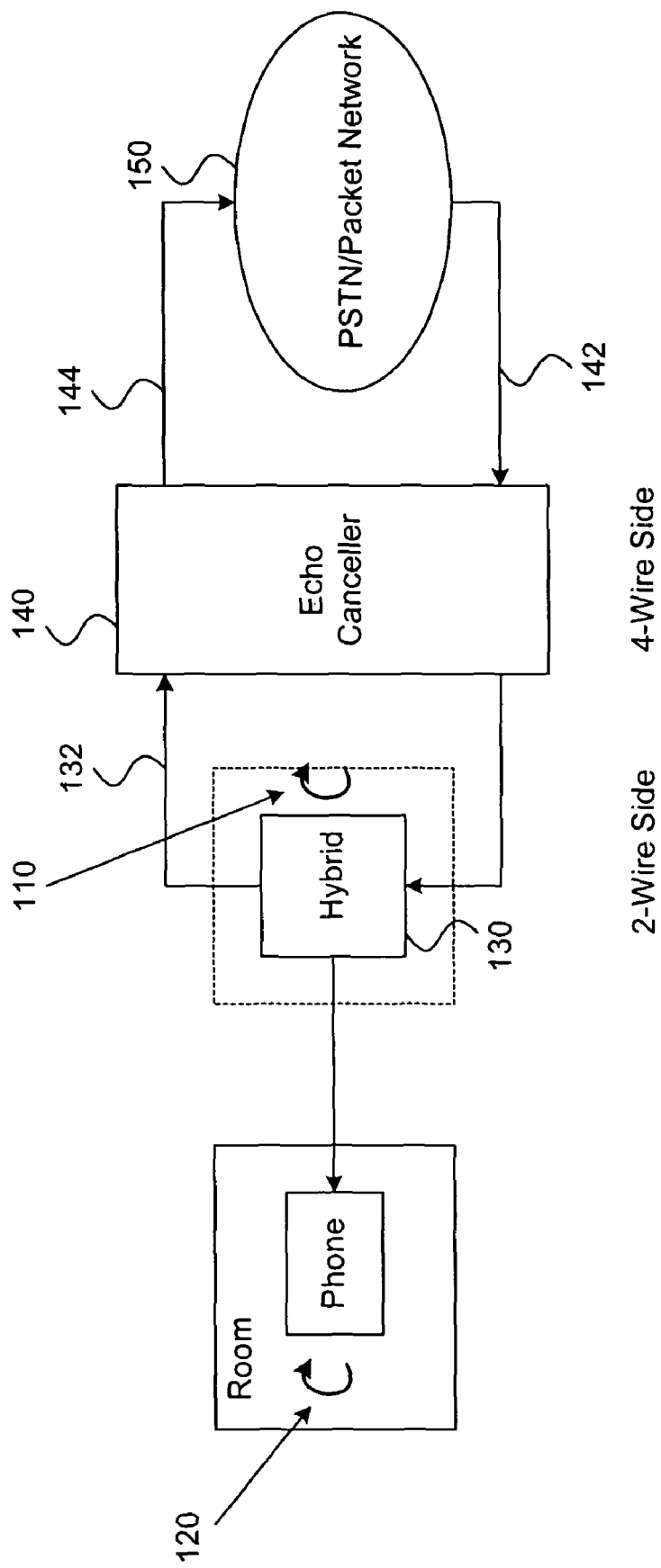
FIG. 1 illustrates a block diagram of a conventional communication system showing a placement of an echo canceller in an access network.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
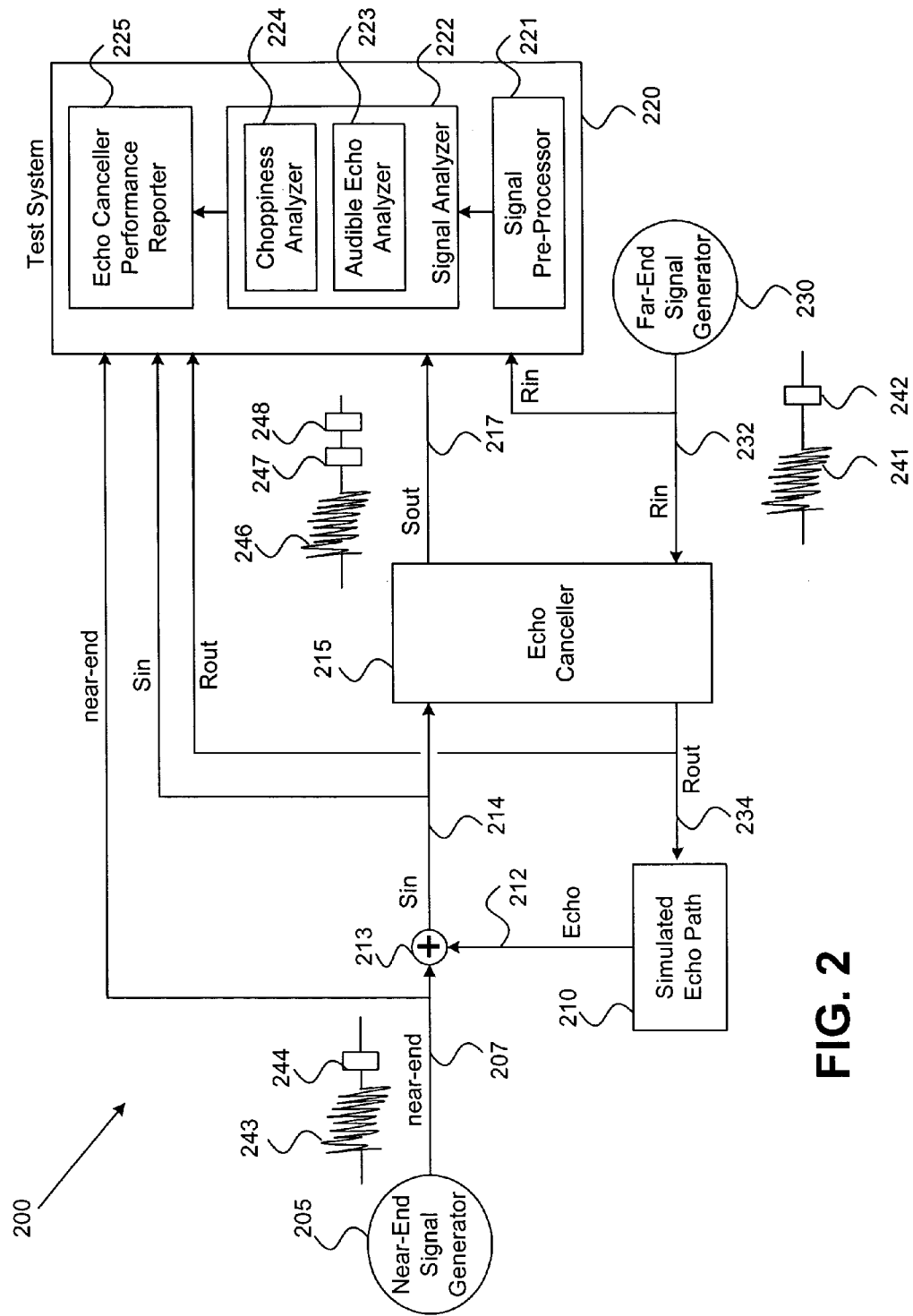
FIG. 2 illustrates a block diagram of an automated echo canceller testing system, according to one embodiment of the present invention.

FIG. 2 illustrates a block diagram of automated echo canceller testing system 200, according to one embodiment of the present invention. Automated echo canceller testing system 200 is utilized to test performance of echo canceller 215 under various conditions that are simulated using far-end signal generator 230, near-end signal generator 205 and simulated echo path 210.

Automated echo canceller testing system 200 utilizes a set of automatic and repeatable tests using real speech signals under single talk and double talk conditions, and after an echo path change. This approach makes automated echo canceller testing system 200 suitable for regression testing and isolation of conditions with unsatisfactory performance, and provides an echo canceller evaluation that correlated the subjective evaluation. Automated echo canceller testing system 200 includes three levels of operation, namely, (i) signal pre-processing and data generation, (ii) signal analysis, and (iii) reporting. During the first part of operation, automated echo canceller testing system 200 runs a set of tests on an echo canceller under test or echo canceller 215 using real speech signals under single talk and double talk scenarios and also under an echo path change scenario, and generates data for analysis by automated echo canceller testing system 200.

For example, far-end signal generator 230 generates far end real speech signal or Rin signal 232, which is received by echo canceller 215. Echo canceller 215 uses Rin signal 232 to generate Rout signal 234, which is passed on to simulated echo path 210. Simulated echo path 210 modifies Rout signal 234 to simulate hybrid echo path 110 (and/or acoustic echo path 120) to generate echo signal 212. Simulated echo path 210 modifies changes the echo path during the test while echo canceller 215 is under test to generate data for analyzing performance of echo canceller as a result of echo path changes. Near-end signal generator 205 generates near-end signal 207, which is added to the echo signal 212 by the adder 213 to create Sin signal 214, which is another signal received by echo canceller 215, which then generates signal Sout 217 based on the two input signals, i.e. Rin signal 232 and Sin signal 214.

As Rin signal 232 and Sin signal 214 are received by echo canceller 215, its adaptive filter grows to form an estimated echo path model based on the analysis of Rin signal 232 and Sin signal 214. Echo canceller 215 can be a SPARSE echo canceller, which employs adaptive filter algorithms with a dynamically positioned window to cover a desired echo location (or several echo locations) within the entire echo tail length. In one embodiment, echo canceller 215 uses a sliding window, e.g. a 24 ms window, located within a specific portion of possible echo path delay, e.g. up to a 128 ms delay. To properly cancel the echo, echo canceller 215 must determine the optimal location for the window, which is sometimes called pure delay or bulk delay, which is indicative of the location of the echo signal within the 128 ms echo path delay. A bulk delay parameter stores the location of bulk delay, which is determined by echo canceller 215 based on an analysis of the echo path delay.

Echo canceller 215 may handle many different real-life scenarios of different far-end signals and near-end signals, as well as different echo paths. In ordinary conversations, either one person (which can be the far-end or the near-end) is talking or both persons are talking at the same time. When the person at near-end 205 is talking and the person at far-end 230 is silent, echo signal 212 is almost silent (disregarding the noise), and the goal of echo canceller 215 is to pass Sin signal 214 unchanged to Sout signal 217. However, when the person at far-end 230 is talking and the person at near-end 205 is silent, the goal of echo canceller 215 is to reduce the level of echo on Sout 217, which is the echo that will be heard by the person at far-end 230. This condition is commonly referred to as a "single-talk" condition. When both persons at near-end 205 and far-end 230 are talking simultaneously, the goal of echo canceller 215 is to pass near end signal 207 to Sout signal 217 with minimal loss of fidelity, while also blocking as much echo signal 212 from being present in Sout signal 217. This condition is commonly referred to as a "double talk" condition.

In addition, the echo path may change during any given call. For the purpose of the tests, an echo path simulator of echo canceller testing system 200 can change the echo path location (i.e. bulk delay), the level of the echo (or echo return loss (ERL)), or the impulse response of the simulated echo. It is also possible for the simulated echo path to include no echo at all, which in this case Sin signal 214 will be identical to near-end signal 207. This condition is commonly referred to as an "infinite ERL" condition.

Since the linear filter of the echo canceller cannot sometimes remove all of the echo due to possible non-linear components in the echo, audible residual echo might remain even after the linear filter cancellation. Such residual echo can, despite its relatively low level, be quite disturbing and should therefore be removed. Echo cancellers typically use a Non-Linear Processor (NLP) to suppress the residual echo. Many NLPs commonly engage when the level of the residual echo is high, and when engaged, the output of the linear filter of the echo canceller is replaced with a comfort noise signal, removing those parts of a communications signal containing residual echo. As a result, when both a near-end and a far-end speaker are active (i.e., during double-talk), such known NLPs either pass the residual echo through or remove both the near end speech and the residual echo. The removal of the near end speech from the processed signal, even if by "filling in" with comfort noise, create a choppiness of the near end speed, which is often bothersome to a listener. Automated echo canceller testing system 200 generates data for analysis in its second level of operation to determine when echo canceller 215 utilizes the NLP and measures choppiness of Sout signal 217 generated by echo canceller 215.

As further shown in FIG. 2, test system 220 is connected to echo canceller 215 for testing the performance of echo canceller 215. Test system includes signal pre-processor 221, signal analyzer 222, and echo canceller performance reporter 225 for reporting the test results. Test system 220 receives near-end signal 207, Sin signal 214, Rout signal 234, Rin signal 232 and Sout signal 217. Signal analyzer 222 also includes audible echo analyzer 223 and choppiness analyzer 224.

Prior to determining choppiness and echo audibility of Sout signal 217, signal pre-processor 221 aligns two or more of near-end signal 207, far-end signal 232, Sin signal 214 and/or Sout signal 217, because the relative timing between these signals is uncertain due to VoIP delays. To align the signals, in one embodiment, test system 220 inserts one or more chirp signals after test signals generated as Rin signal 232 and near-end signal 207 by far-end signal generator 230 and near-end signal generator 205, respectively. As shown, far-end signal generator 230 generates far-end test signal 241 followed by far-end chirp signal 242 and near-end signal generator 205 generates near-end test signal 243 followed by near-end chirp signal 244. As further shown in FIG. 2, far-end chirp signal 242 and near-end chirp signal 244 appear as chirp signals 248 and 247, respectively, following Sout test signal 246. Far-end chirp signal 242 and near-end chirp signal 244 act as time markers that allow Sout test signal 246 to be accurately synchronized with far-end test signal 241 and near-end test signal 243.

In one embodiment of the present invention, a chirp signal is a signal that its frequency varies linearly over time in a frequency range covering most of the frequency range 0-4 KHz. For example, in one embodiment, near-end chirp signal 244 is an up chirp, which starts with a low frequency and over 512-sample time its frequency is increased linearly. Conversely, far-end chirp signal 242 is a down chirp, which starts with a high frequency and over 512-sample time its frequency is decreased linearly. Further, near-end chirp signal 244 and far-end chirp signal 242 occur at different times after their respective test signal ends, so they do not overlap. For example, as shown in FIG. 2, near-end chirp signal 244 is generated closer in time to near-end test signal 243 than far-end chirp signal 242 is to far-end test signal 241. As a result, chirp signals 247 and 248 do not overlap.

Because echo canceller 215 may cancel far-end chirp signal 242, in one embodiment, automated echo canceller testing system 200 may disable echo canceller 215, by issuing a command, after transmitting far-end test signal 241, such that far-end chirp signal 242 may pass through to Sout signal 217. If chirp signals 247 or 248 is correlated with the reference up-chirp signal or the reference down-chirp signal, respectively, a signal peak would be generated that is indicative of signal synchronization and, as a result, chirp signals 242 and 244 can be utilized to determine the signal timing and align near-end signal 207, far-end signal 232, Sin signal 214 and Sout signal 217.

Figure 3:
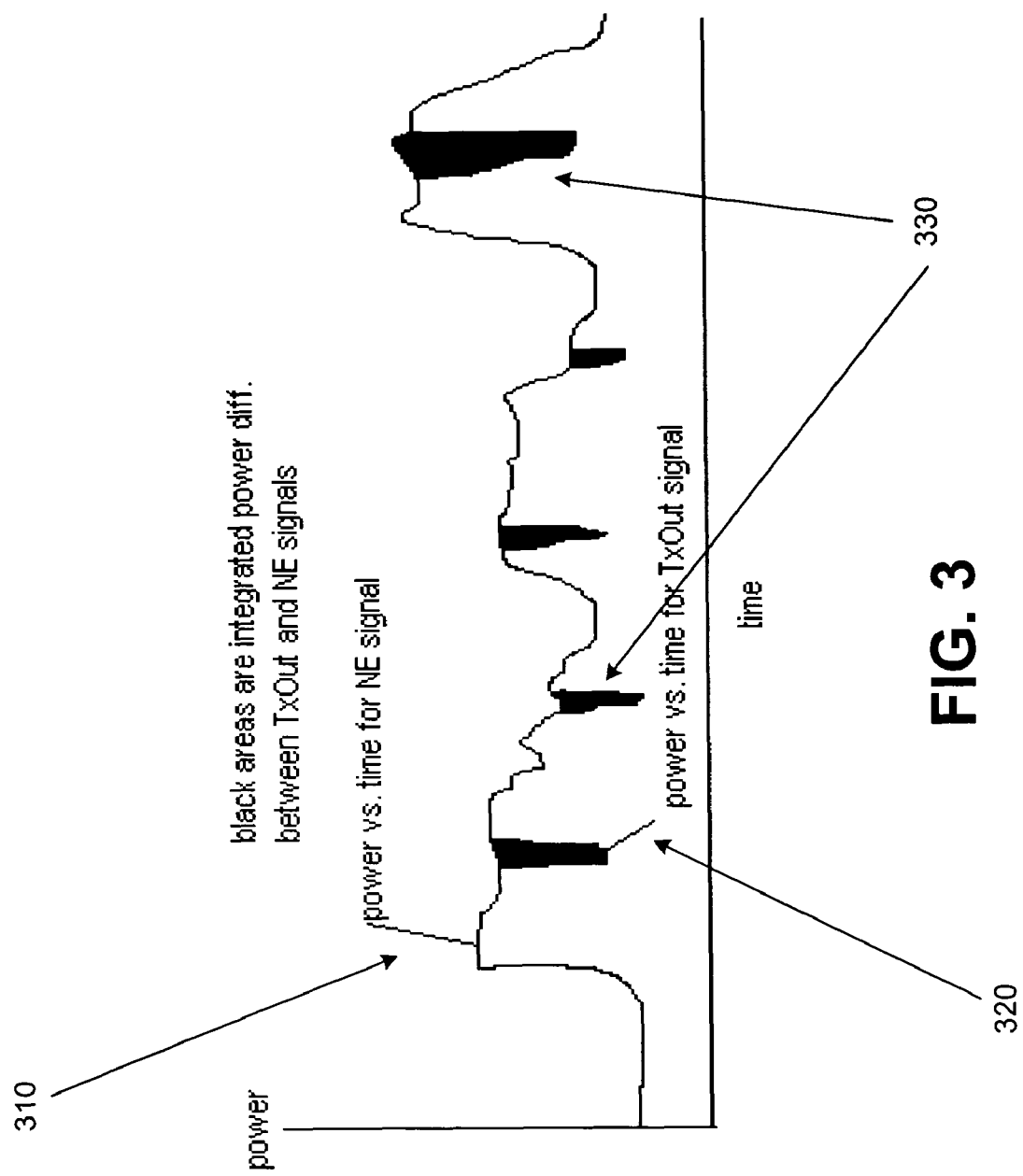
FIG. 3 illustrates a power versus time diagram for near-end signal and Sout signal of FIG. 2.

In one embodiment, choppiness analyzer 224 measures choppiness of the signal when analysis frames or A-frames are indicative of NLP being active, such as having the NLP flag set to one by the echo canceller under test. To this end, signal pre-processor 221 aligns Sout signal 217 and near-end signal 207 before measuring choppiness as sum of differences in negative power between Sout signal 217 and near-end signal 207. FIG. 3 illustrates near-end signal power-versus-time 310 and Sout signal power-versus-time 320, where black areas 330 designate power differences between near-end signal 207 and Sout signal 217. To determine choppiness, choppiness analyzer 220 integrates black areas 330. Accordingly, unlike conventional testing systems, automated echo canceller testing system 200 is capable of providing an objective measure of choppiness.

Figure 4:
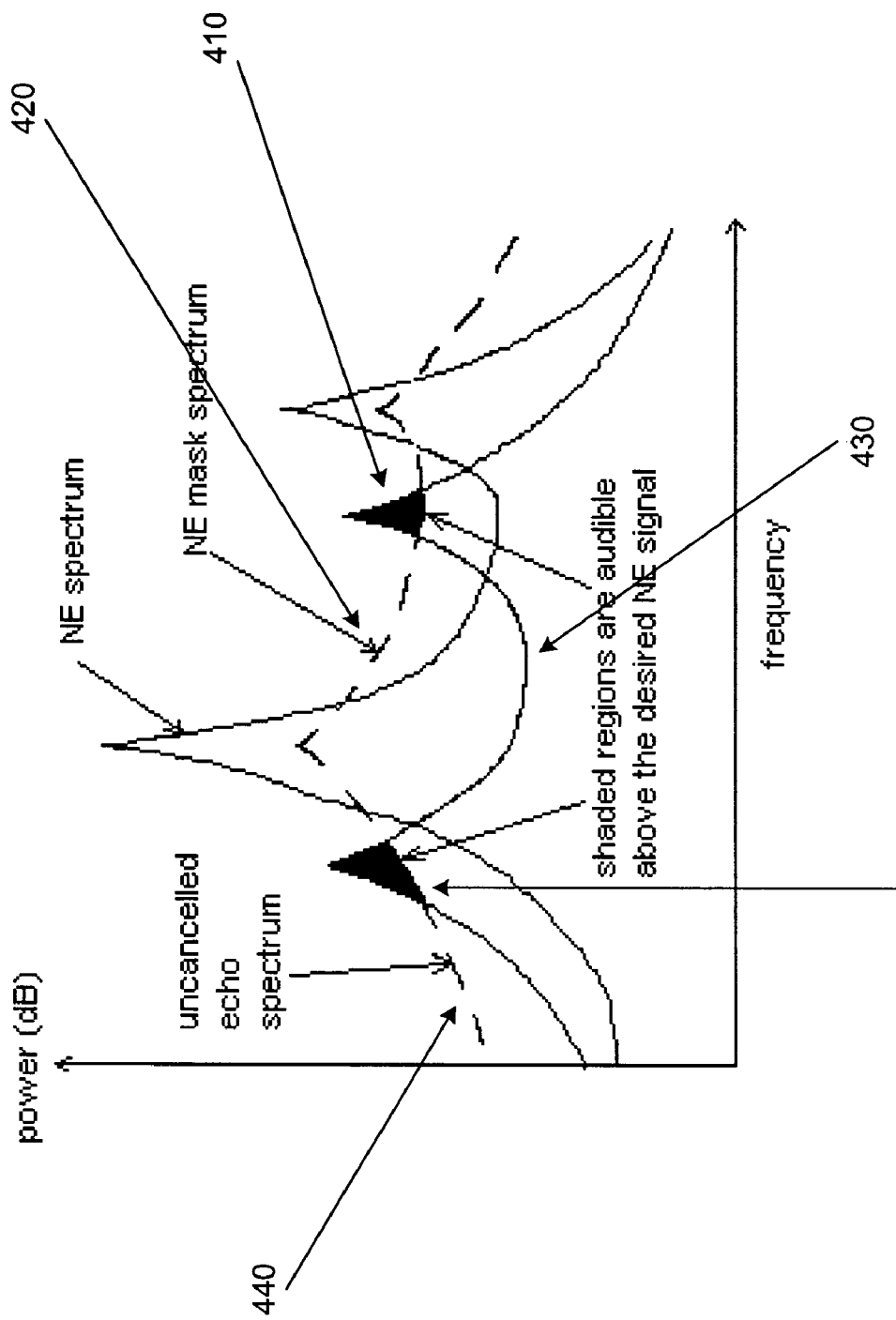
FIG. 4 illustrates a power versus frequency diagram depicting areas of audible echoes not masked by near-end signal of FIG. 2.

Furthermore, audible echo analyzer 223 measures echo audibility during double talk conditions when analysis frames or A-frames are indicative of NLP not engaged or when being deactivated (e.g., when NLP flag set to zero for the echo canceller under test). To this end, signal pre-processor 221 aligns Sout signal 217 and near-end signal 207 before audible echo analyzer 223 determines residual echo by subtracting near-end signal 207 from Sout signal 217. With reference to FIG. 4, for each test, when the NLP is not engaged or when deactivated, audible echo analyzer 223 measures audible echo by integrating uncancelled echo power in each frame, shown as regions 410, that exceeds spectral masking threshold 420 derived from near-end signal 207. Since near-end signal 207 may mask a portion of echo and thus rendering it inaudible, only the portion of each frame that exceeds spectral masking threshold is considered audible. Audible echo analyzer 223 scales audible echo power by the power of near-end signal 207 to account for level variations of near-end signal 207. FIG. 4 illustrates partial masking of the uncancelled echo by near-end signal 207 during a single frame. Audible echo analyzer 223 adds regions 410 over time (i.e. frames) to obtain an objective measure of total audible echo power during an analysis interval. Further, audible echo analyzer 223 may determine echo signal 430 by subtracting near-end signal 207 from Rout signal 234, calculate audible masking function 440 based on echo signal 430 and the first signal, and integrating regions 410 defined by audible masking function 440, echo signal 430 and near-end signal 207.

Figure 5:
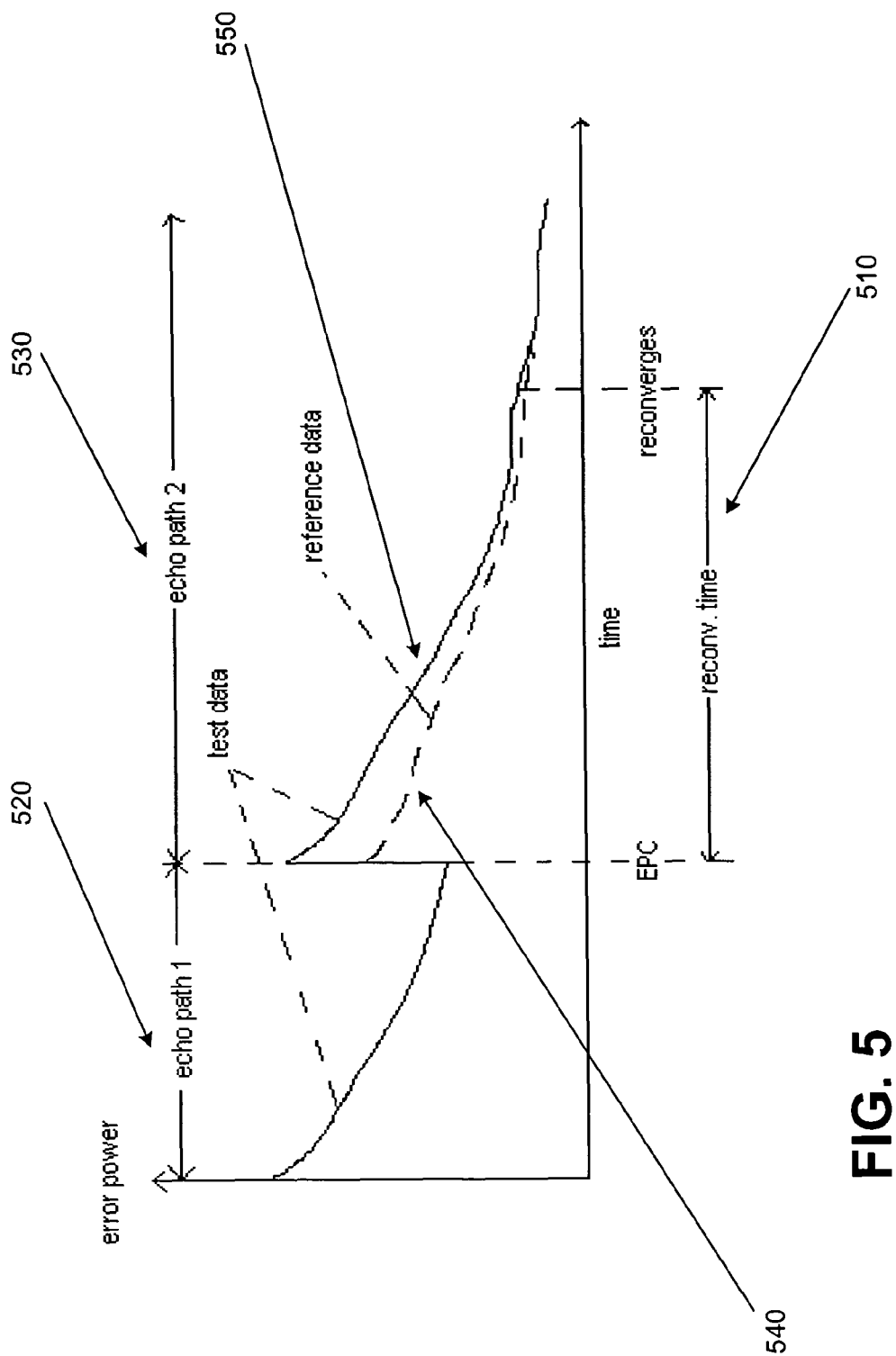
FIG. 5 illustrates a re-convergence graph for an echo canceller to re-converge after an echo path change.

In addition to measuring choppiness and audible echo, test system 220 can measure the amount of time it takes for echo canceller 215 to re-converge after simulated echo path 210 changes the echo path, for example, by changing the bulk delay or switching from infinite ERL to finite ERL. Unlike conventional echo canceller testing systems, which compare the re-convergence time of the echo canceller with re-convergence time of a reference echo canceller, automated echo canceller testing system 200 compares the re-convergence time of echo canceller 215 after an echo path change with the time it takes echo canceller 215 itself to converge according to the new echo path after initializing echo canceller 205 to default coefficients. In other words, echo canceller 205 is used as its own reference. In one embodiment, the re-convergence time is defined as the time it takes for echo canceller 205 to have uncancelled echo power that is within a predetermined level, such as 5 dB, of the uncancelled echo power of a reference signal derived from the reinitialized echo canceller after the echo path change. FIG. 5 illustrates re-convergence time 510 after an echo path change (EPC), after first echo path 520 is changed to second echo path 530. Reference data 540 shows a re-convergence curve after initializing echo canceller 205 when an echo path change occurs, and test data 550 shows a re-convergence curve when echo canceller 205 is allowed to converge from its current state after an echo path change.

In another embodiment, rather than initializing echo canceller 205 to define a reference, echo canceller 205 may be initialized with predetermined coefficients that are known to be optimum coefficients for the new echo path to determine the optimum performance of echo canceller 215. The re-convergence time is determined based on the time it takes for echo canceller 205 to re-converge after an echo path change and achieve the optimum performance.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of evaluating an echo canceller, the method comprising:
   transmitting a first signal to the echo canceller, wherein the first signal includes a first speech signal and a first marker signal, and wherein the first marker signal is transmitted a first period of time after the first speech signal is transmitted;
   receiving a second signal from the echo canceller, wherein the second signal includes a second speech signal and a second marker signal; and
   aligning the first speech signal and the second speech signal using the first marker signal and the second marker signal.

2. The method of claim 1, wherein the first signal is generated by a far-end signal generator.

3. The method of claim 1, wherein the first signal is generated by a near-end signal generator.

4. The method of claim 1, wherein the first marker signal is a chirp signal having a frequency that varies linearly over time.

5. The method of claim 4, wherein the frequency varies linearly over time from high to low.

6. The method of claim 1 further comprising:
   transmitting a third signal to the echo canceller, wherein the third signal includes a third speech signal and a third marker signal, and wherein the third marker signal is transmitted a second period of time after the third speech signal is transmitted;
   receiving a fourth signal from the echo canceller, wherein the fourth signal includes a fourth speech signal and a fourth marker signal; and
   aligning the third speech signal and the fourth speech signal using the third marker signal and the fourth marker signal;
   wherein the first period of time and the second period time are determined such that transmission of the first marker signal does not overlap with transmission of the third marker signal.

7. The method of claim 1 further comprising:
   determining a choppiness of the second speech signal based on analyzing the first speech signal and the second speech signal, when a non-linear processor of the echo canceller is on.

8. The method of claim 7, wherein the choppiness is determined by integrating negative power differences between the first speech signal and the second speech signal.

9. The method of claim 1 further comprising:
   determining an audible echo of the first speech signal in the second speech signal, when a non-linear processor of the echo canceller is off.

10. The method of claim 1 further comprising: determining an echo signal by subtracting the second signal from the first signal.

11. The method of claim 10 further comprising: calculating an audible masking function based on the echo signal and the first signal.

12. The method of claim 11 further comprising: integrating regions defined by the audible masking function, the echo signal and the first signal.

13. The echo canceller test system of claim 12, wherein the first marker signal is a chirp signal having a frequency that varies linearly over time.

14. The method of claim 1 further comprising:
   disabling the echo canceller after transmitting the first speech signal but prior to transmitting the first marker signal.

15. An echo canceller test system for evaluating an echo canceller, the echo canceller test system comprising:
   a first signal generator configured to transmit a first signal to the echo canceller, wherein the first signal includes a first speech signal and a first marker signal, and wherein the first marker signal is transmitted a first period of time after the first speech signal is transmitted;
   a signal analyzer configured to receive a second signal from the echo canceller, wherein the second signal includes a second speech signal and a second marker signal;
   wherein the signal analyzer is further configured to align the first speech signal and the second speech signal using the first marker signal and the second marker signal, prior to analyzing.

16. The echo canceller test system of claim 15, wherein the first signal generator a far-end signal generator.

17. The echo canceller test system of claim 15, wherein the first signal generator is a near-end signal generator.

18. The echo canceller test system of claim 16, wherein the frequency varies linearly over time from high to low.

19. The echo canceller test system of claim 15 further comprising:
- a second signal generator configured to transmit a third signal to the echo canceller, wherein the third signal includes a third speech signal and a third marker signal, and wherein the third marker signal is transmitted a second period of time after the third speech signal is transmitted;
- wherein the signal analyzer receives a fourth signal from the echo canceller, wherein the fourth signal includes a fourth speech signal and a fourth marker signal, wherein the signal analyzer aligns the third speech signal and the fourth speech signal using the third marker signal and the fourth marker signal, and wherein the first period of time and the second period time are determined such that transmission of the first marker signal does not overlap with transmission of the third marker signal.

20. The echo canceller test system of claim 15, wherein the signal analyzer includes a choppiness analyzer configured to determine a choppiness of the second speech signal based on analyzing the first speech signal and the second speech signal, when a non-linear processor of the echo canceller is on.

21. The echo canceller test system of claim 20, wherein the choppiness analyzer determines the choppiness by integrating negative power differences between the first speech signal and the second speech signal.

22. The echo canceller test system of claim 21, wherein the signal analyzer includes a audible echo analyzer configured to determine an audible echo of the first speech signal in the second speech signal, when a non-linear processor of the echo canceller is off.

23. The echo canceller test system of claim 15, wherein the choppiness analyzer determines an echo signal by subtracting the second signal from the first signal.

24. The echo canceller test system of claim 23, wherein the choppiness analyzer calculates an audible masking function based on the echo signal and the first signal.

25. The echo canceller test system of claim 24, wherein the choppiness analyzer integrates regions defined by the audible masking function, the echo signal and the first signal.

26. The echo canceller test system of claim 15, wherein the first signal generator disables the echo canceller after transmitting the first speech signal but prior to transmitting the first marker signal.

* * * * *